United States Patent [19]
Hehl

[11] Patent Number: 5,511,963
[45] Date of Patent: Apr. 30, 1996

[54] MOLD CLOSING UNIT FOR USE IN AN INJECTION MOLDING MACHINE FOR PROCESSING SYNTHETIC MATERIALS

[76] Inventor: Karl Hehl, Arthur-Hehl-Strasse 32, D-72290 Lossburg, Germany

[21] Appl. No.: 231,668

[22] Filed: Apr. 25, 1994

[30] Foreign Application Priority Data

Apr. 24, 1993 [DE] Germany .......................... 43 13 472.6

[51] Int. Cl.⁶ .................................................. B29C 45/66
[52] U.S. Cl. ........................ 425/190; 100/231; 100/281; 425/451.6; 425/593
[58] Field of Search .................. 425/190, 451.2, 425/451.6, 590, 593; 100/231, 281

[56] References Cited

U.S. PATENT DOCUMENTS

| | | | |
|---|---|---|---|
| 3,577,596 | 5/1971 | Bullard et al. | 425/151 |
| 3,976,416 | 8/1976 | Hehl | 425/593 |
| 5,122,051 | 6/1992 | Joyner | 425/593 |
| 5,354,196 | 10/1994 | Ziv-Av | 425/593 |

FOREIGN PATENT DOCUMENTS

| | | |
|---|---|---|
| 0164419 | 3/1989 | European Pat. Off. . |
| 0427438 | 5/1991 | European Pat. Off. . |
| 0271588 | 9/1991 | European Pat. Off. . |
| 1116386 | 11/1961 | Germany . |
| 4230348 | 3/1993 | Germany . |
| WO94/04337 | 3/1994 | WIPO . |

OTHER PUBLICATIONS

Patent Abstracts of Japan, vol. 14, No. 6 (M–916) (3949) Jan. 9, 1990 & JP 1-255516, Dec. 10, 1989.

*Primary Examiner*—James P. Mackey
*Attorney, Agent, or Firm*—Spencer & Frank

[57] ABSTRACT

In a mold closing unit for use in an injection molding machine for processing synthetic materials arranged on a mounting surface an electro-mechanical drive is applied in a toggle mechanism, at which the driving unit is movably held. The electro-mechanical drive converts a rotational movement of a driving unit into a linear movement for the toggle. The length of the lever and the length of the driving element is less than the distance from the mounting surface to the link points. A quill motor can be provided as a driving unit. This arrangement allows that the linear drive and the mold closing unit can be of a shorter and more compact construction.

9 Claims, 11 Drawing Sheets

MOLD CLOSING UNIT FOR USE IN AN INJECTION MOLDING MACHINE FOR PROCESSING SYNTHETIC MATERIALS

CROSSREFERENCE TO RELATED APPLICATION

This application claims the priority of German Patent Application P 43 13 472.6, filed Apr. 24, 1993, which is incorporated herein by reference.

BACKGROUND OF THE INVENTION

1. Field of the Invention

This invention relates to a mold closing unit for use in an injection molding machine for processing synthetic materials, comprising an electro-mechanical driving unit jointedly connected with a movable mold carrier and a supporting element by a toggle mechanism and arranged transversally with respect to a closing direction. The electro-mechanical driving unit is held freely movable by the toggle mechanism, which is adapted to move the movable mold carrier in and out of a closed position with the stationary mold carrier in the closing direction and comprises a driving element for driving the toggle mechanism.

2. Description of the Prior Art

From German Published Patent Application 42 30 348 a machine of this kind is known, in which a supporting element and a mold carrying plate are jointedly connected with a machine base of cast iron, which deviates the forces occuring during the closing and the injection process. The movable mold carrier and the supporting element are jointedly connected by a toggle mechanism, at which a driving device is freely suspended at link points of toggle levers, whereby evasive movements of the movable mold carrier are avoided. The principle followed is to form the machine base so rigidly that it is only minimally deformed under the occuring forces and additionally, to keep away the remaining deformations from the mold by the jointed bearing. Mechanical and/or electrical drives are suggested as driving units, however, hydraulic and pneumatic drives are prefered with regard to their space requirement.

Those linear drives, which transmit a rotational movement, preferably of an electro-mechanical drive, to a linearly moving element, are provided with a ball rolling spindle as for example disclosed in European Patent 271 588 and with a double toothed rack as known from European Published Patent Application 427 438. However, in all these cases the linear drive is used as drive actuating directly in closing direction, which again acts directly upon the movable mold carrier, so that the space required for the linear drive plays only a secondary part. In such an arrangement problems concerning the reproduceability of of the closing force crop up, due to the difficultly in controlling the backlash of threads.

According to European Patent 164 419 a ball rolling spindle can also be used for actuating a toggle. Here only low current is necessary in order to keep the toggle in its extended position. However, the linear drive is mounted in a separate place at the machine base, so that additional space is required for the drive, but since in this arrangement the spindle and the motor are supported in a way that permits rotational movements only, this is a burden.

SUMMARY OF THE INVENTION

It is an object of the invention to provide a mold closing unit for use in an injection molding machine arranged on a mounting surface for processing synthetic materials, which is of the kind described first hereinbefore, in that a shortened and compact type of a linear drive and mold closing unit is made possible.

That object is accomplished in accordance with the invention in that the driving unit is formed as a quill motor, having a ball rolling spindle inside as a driving element, that is at least partially receivable in the quill motor.

The problem in an arrangement provided with a so-called Y-toggle is that its movements are always transmitted to the driving unit, so that a manageable space has to be made available for it. Certainly, it has been suggested to provide an electro-mechanical linear drive as the driving means, however, an application in this connection runs into difficulties, since the driving element, which protrudes linearly from the driving unit, limits the maximum opening distance during the mold opening process in that it bumps, for example, against the machine base. However, difficulties of this kind can be eliminated by adjusting the length of the lever and the driving element. By this it is also possible to provide the relatively narrow Y-toggle with an electro-mechanical drive. The linear element can be guided inside the quill motor without requiring separate space, and moreover it is not necessary to use an additional gear, so that the space requirement for accomodation of the driving unit in the machine base can be further minimized.

According to a preferred feature, the stationary mold carrier, which is fixedly connected with at least a part of a machine base, is jointedly linked with the supporting element for supporting the toggle mechanism by a force transmitting means for transmitting forces between the movable mold carrier and the stationary mold carrier around the mold tentering space. In such an arrangement the jointed coupling of the toggle mechanism creates favorable conditions for the application of a force transmitting element, which is formed as a deformable clamping means and which deforms itself when the forces occuring during the mold closure act upon it. The jointed bearing, provided anyway, basically ensures, that the axial forces are transmitted, whereas deformations are largely kept away from the mold carriers. Since the movable mold carrier and the toggle mechanism can be of a shorter construction, the clamping means is also shorter and of less weight and the axial movements of the mold closing unit are reduced by the deformation of the clamping means, so that the cycle times are also lowered, even if the clamping means is used. The application of the clamping means offers the advantage that guidings can be provided on "the side sheltered from the wind", so that the guidings extending into the mold tentering space can be easily arranged in an area, which is only limitedly accessible for a mold because of the clamping means.

According to a preferred feature the force transmitting means movably supports the supporting element at the machine base in a neutral area of the force transmitting means via bearing elements in the closing direction; the bearing elements are arranged in a plane lying rectangular to the closing direction and substantially through the link point of the toggle mechanism. Due to the utilization of a freely deformable clamping means cooperating with the stationary mold carrier, it is necessary to support the whole mold closing unit reliably and axially movable at a second point. In case of applying a toggle mechanism, it is not necessary to provide a supporting plate anymore, since the jointed connection with the clamping means therefor is sufficient. In order to save time and space required for the supporting plate, the second, axially movable bearing point of the mold closing unit is arranged in an area of the coupling point of the toggle mechanism, namely on the side opposite to the movable mold carrier. The coupling is preferably effected in a neutral area of the clamping means, without disturbing the operation method of the clamping means itself.

DETAILED DESCRIPTION OF THE PREFERRED EMBODIMENTS

The invention will now be described in more detail by example with reference to the embodiments shown in the Figures. It should be kept in mind that the following described embodiments are only presented by way of example and should not necessarily be construed as limiting the inventive concept to any particular physical configuration.

Figure 1:
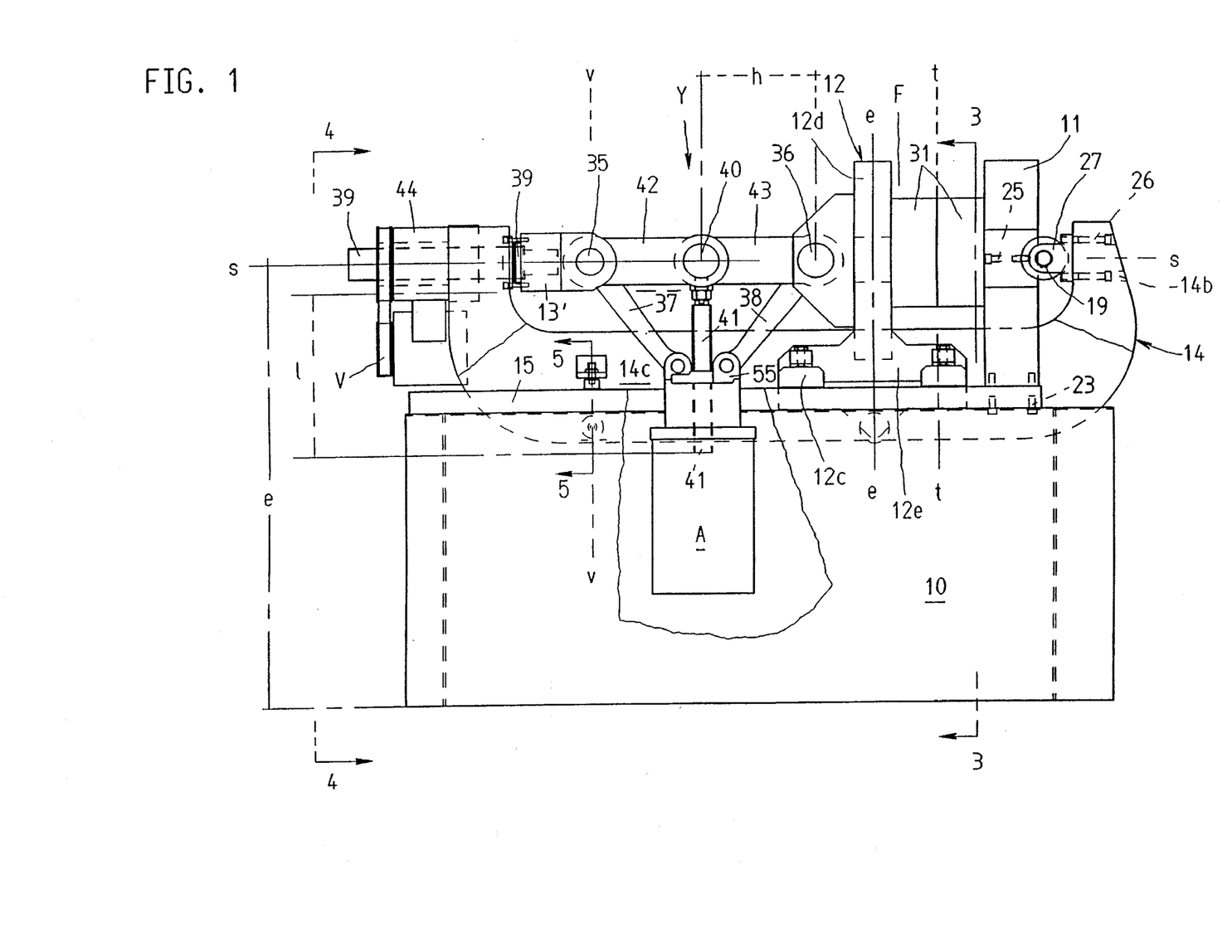
FIG. 1 shows a first embodiment of the mold closing unit in a side view.

The mold closing unit of an injection molding machine for processing synthetic material is provided with a stationary mold carrier 11 and a movable mold carrier 12, which is displaceable along guidings. The space between the two mold carriers constitutes a mold tentering (i.e. clamping) space F for a mold 31 as can be seen in FIG. 1. Parts of the mold 31 are fixable at the stationary mold carrier 11 and at the movable mold carrier 12 as well.

The toggle mechanism engages with a link point 36 in the movable mold carrier 12 and with the link point 35 in a supporting element 13, and transfers the movable mold carrier into and out of a closed position with the stationary mold carrier. The toggle mechanism is formed as a "Y-toggle", that means that its driving unit A, arranged transversally with respect to the closing direction s—s, is held freely movable by two holding elements 37,38 by the toggle mechanism Y. During the mold closure a parallel displacement and vertical movement of the driving unit A is effected. An electro-mechanical linear drive is used as the driving unit, which converts a rotational movement into a linear movement. The toggle mechanism Y is provided with two levers 42, 43, which are interconnected by a hinge point 40. A linear element of the linear drive engages in this hinge point 40.

Figure 6:
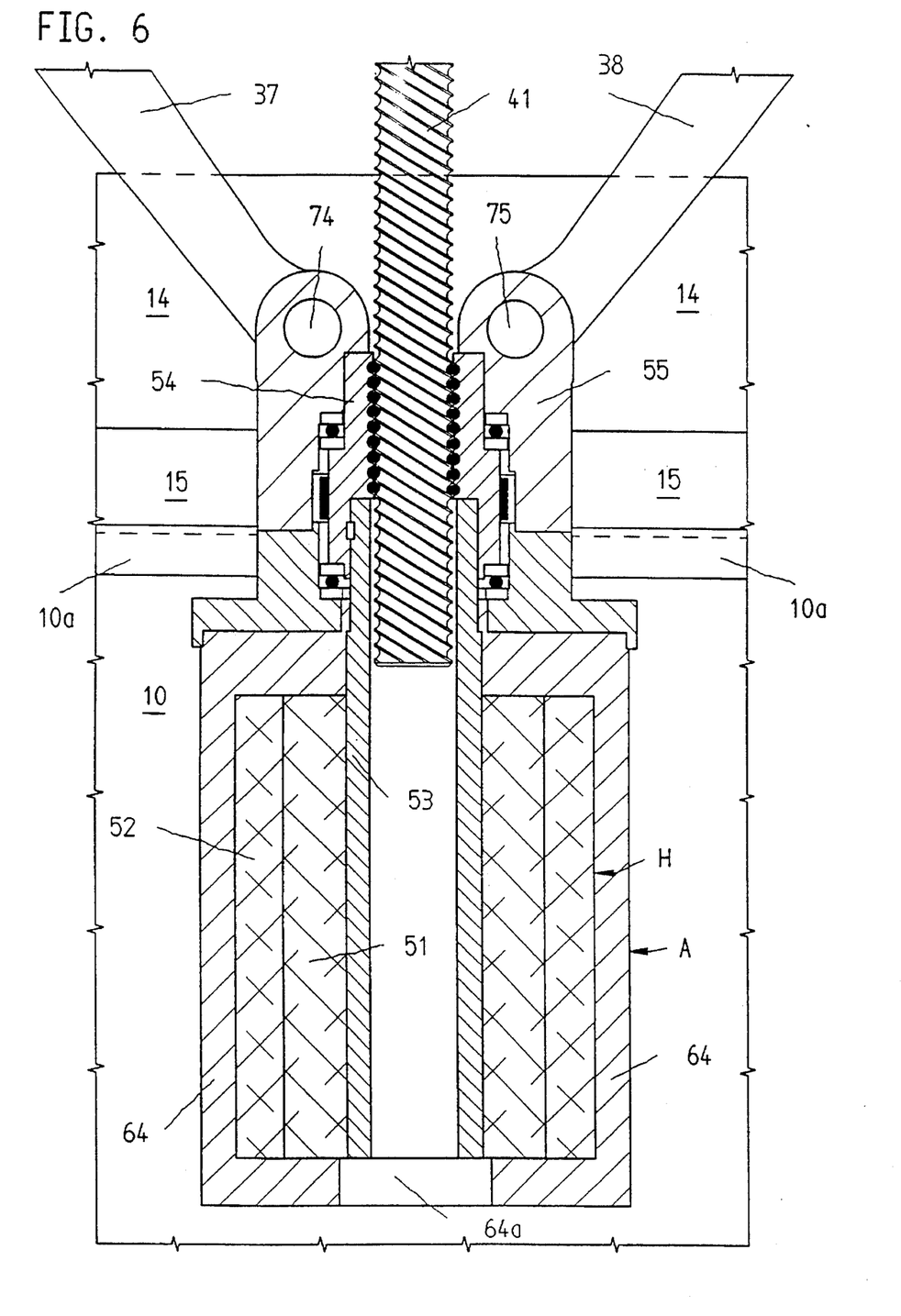
FIG. 6 shows an enlarged, sectional detail view from FIG. 1 in the area of the quill motor.
Figure 7:
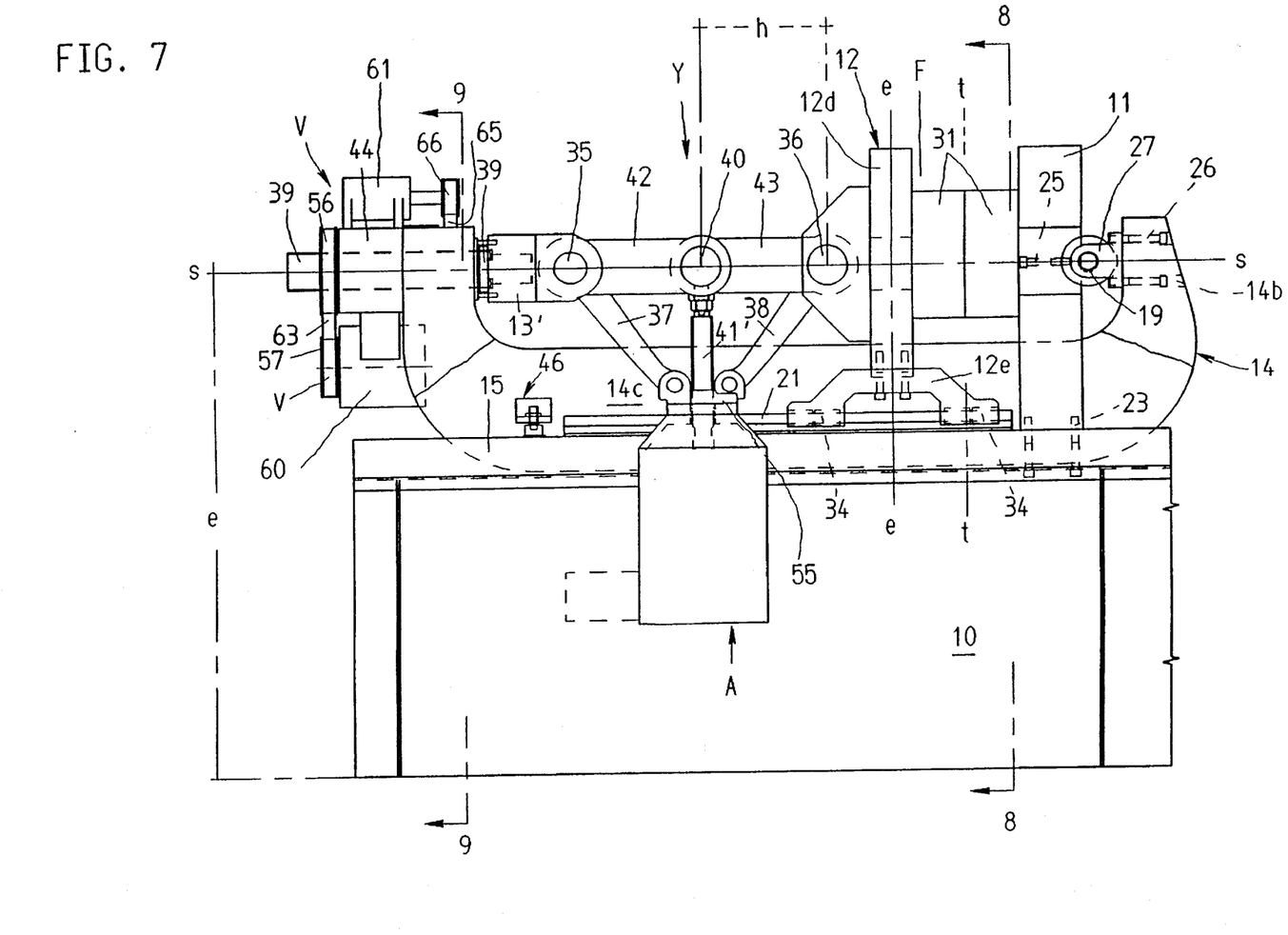
FIG. 7 shows a further embodiment of the mold closing unit in a representation according to FIG. 1.
Figure 8:
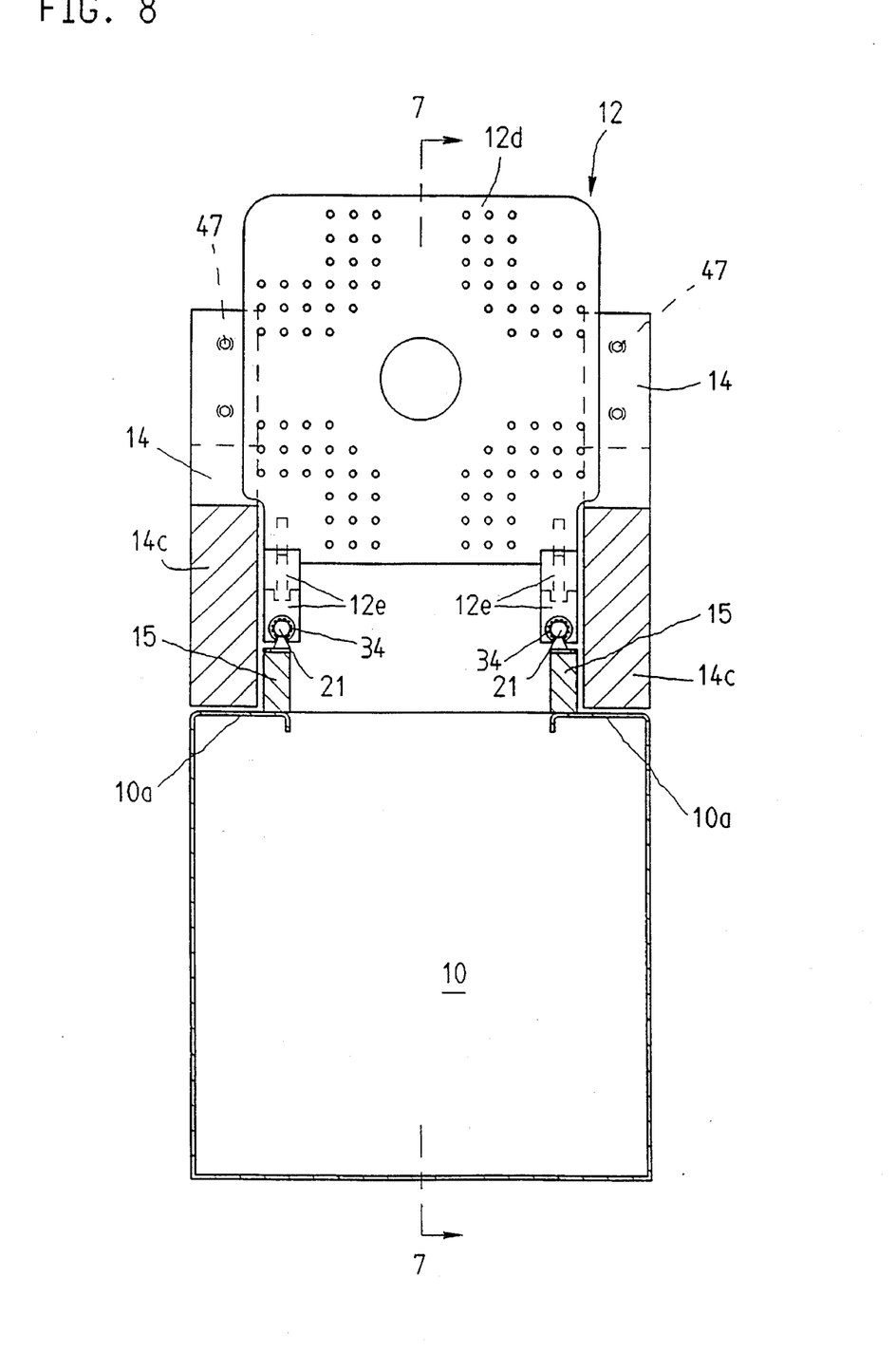
FIGS. 8 and 9 are sectional views through the mold closing unit according to FIG. 7 along the lines 8—8, 9—9.
Figure 9:
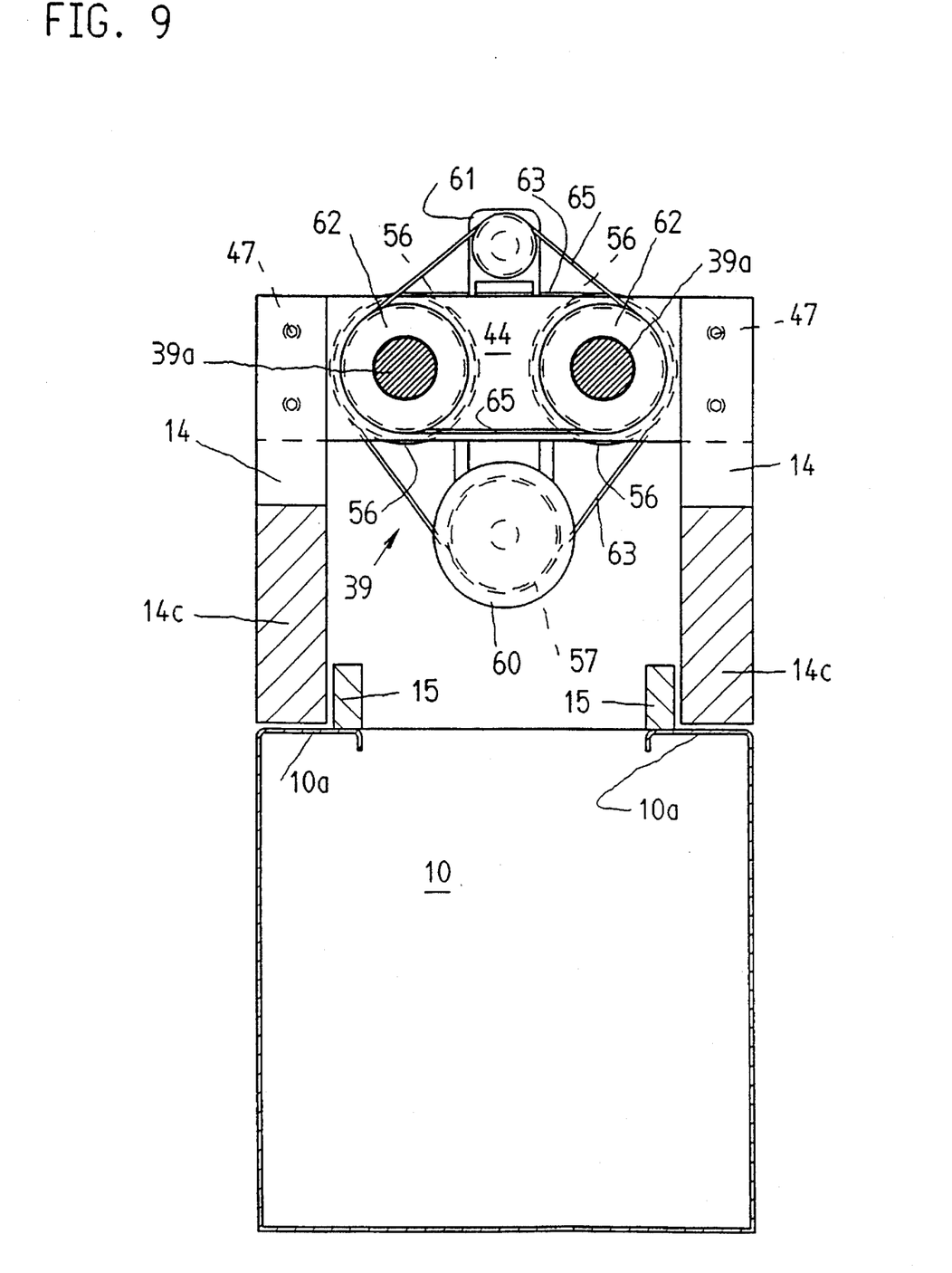
Figure 10:
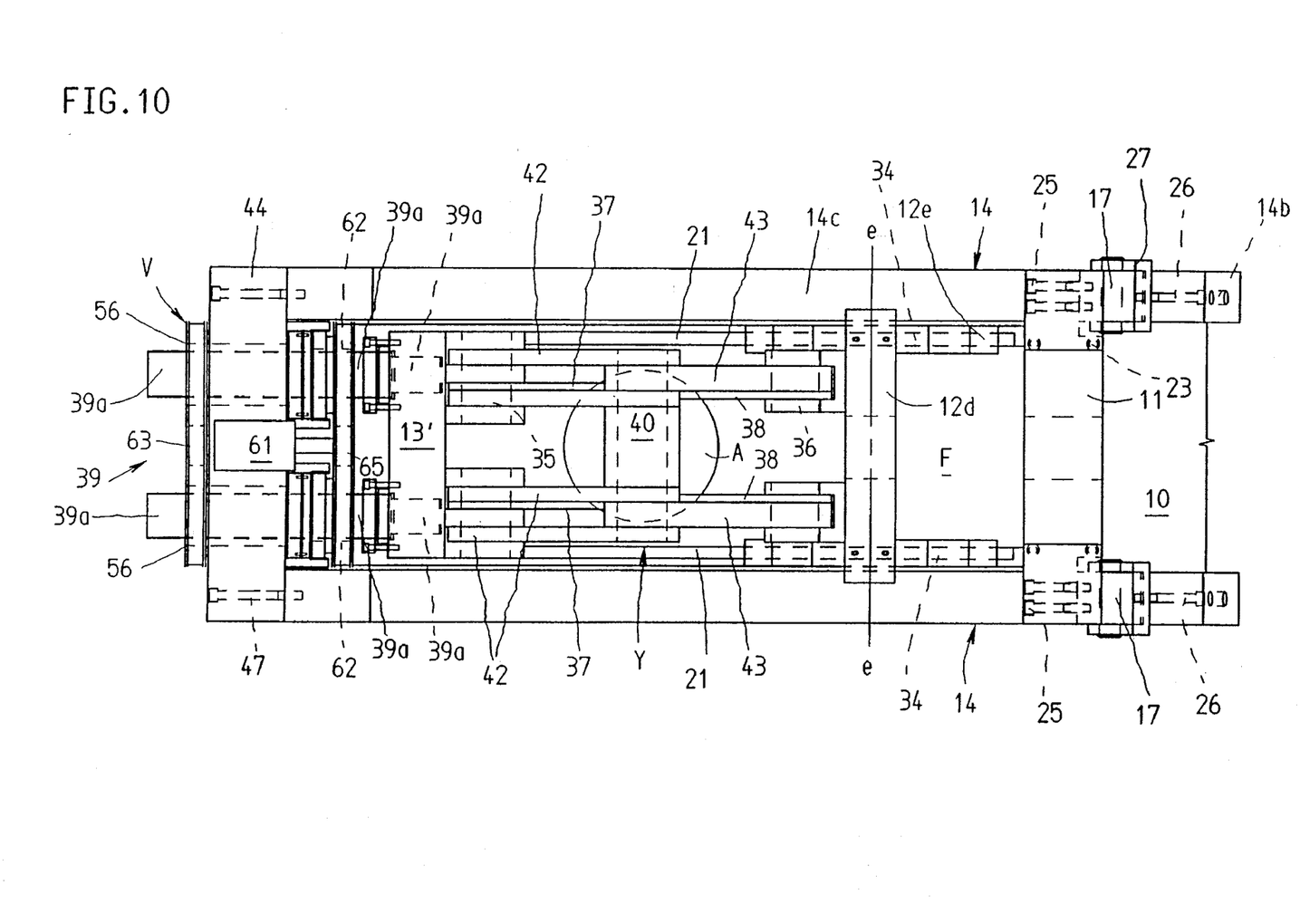
FIG. 10 is a top view of the mold closing unit according to FIG. 7.

As linear elements for generation of a linear movement for example, a ball rolling spindle 41 is at disposal. The length h of the levers 42,43 and the length 1 of the linear element, should be less than the distance e from the mounting surface to the link points. The ball rolling spindle 41 is arranged in a quill motor H, which at the same time serves as driving unit A (FIG. 6). A stator 52 and a rotor 51 are located in a housing 64 of the quill motor H. The rotor 51 is in connection with a sleeve 53. The sleeve 53 coaxially supports a thread nut 54, which cooperates with the ball rolling spindle 41. As a result of the rotation of the thread nut 54 the ball rolling spindle 41 moves into or out of the sleeve 53 during the closure and opening of the mold. If necessary, the ball rolling spindle can be removed from the driving device at its bottom through an orifice 64a of the housing 64. The embodiments holding elements 37,38, which support the driving device, are connected with a joining element 55 at link points 74,75, whereat joining element 55 supports the actual driving device.

Figure 2:
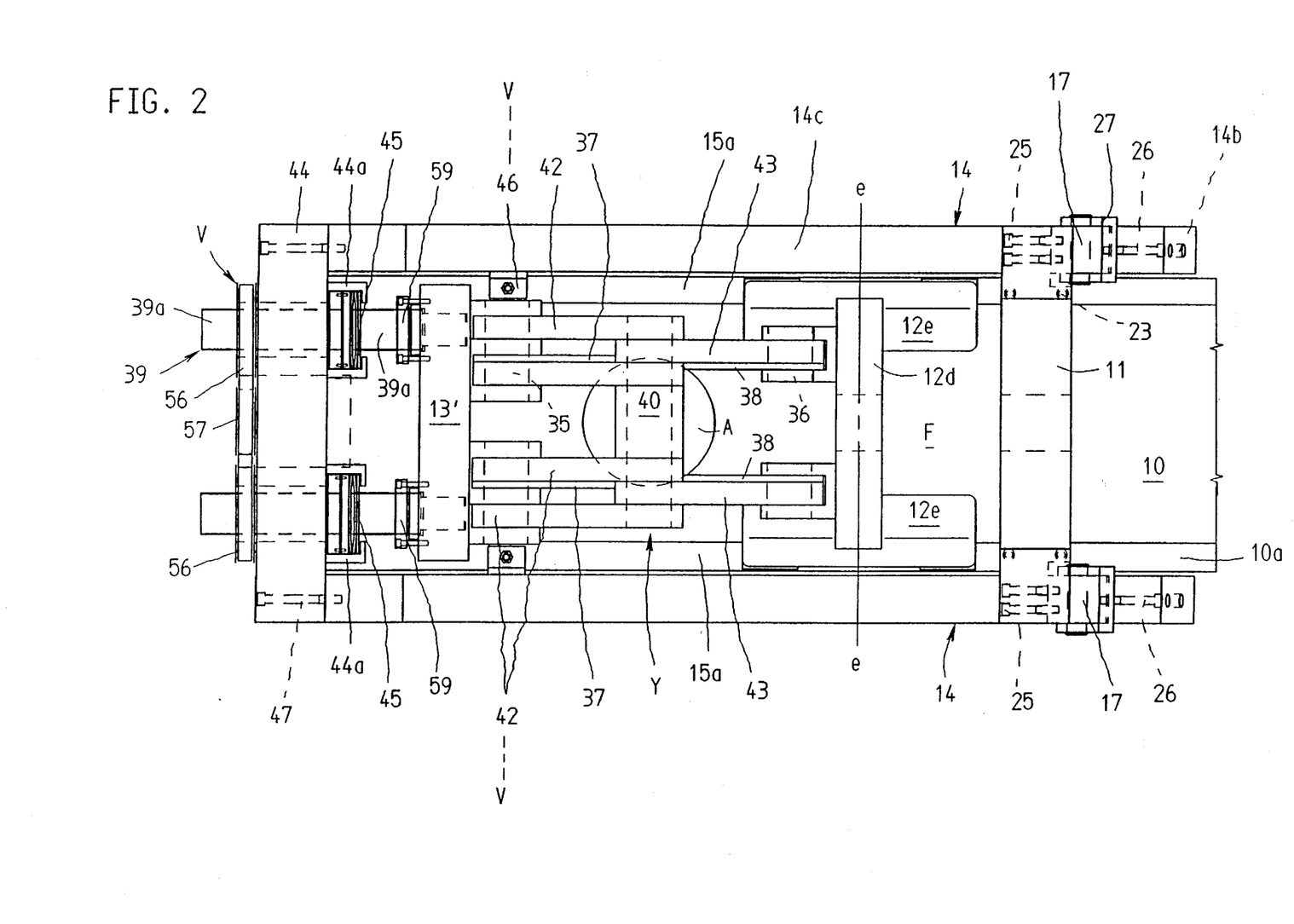
FIG. 2 is a top view of the mold closing unit according to FIG. 1.
Figure 3:
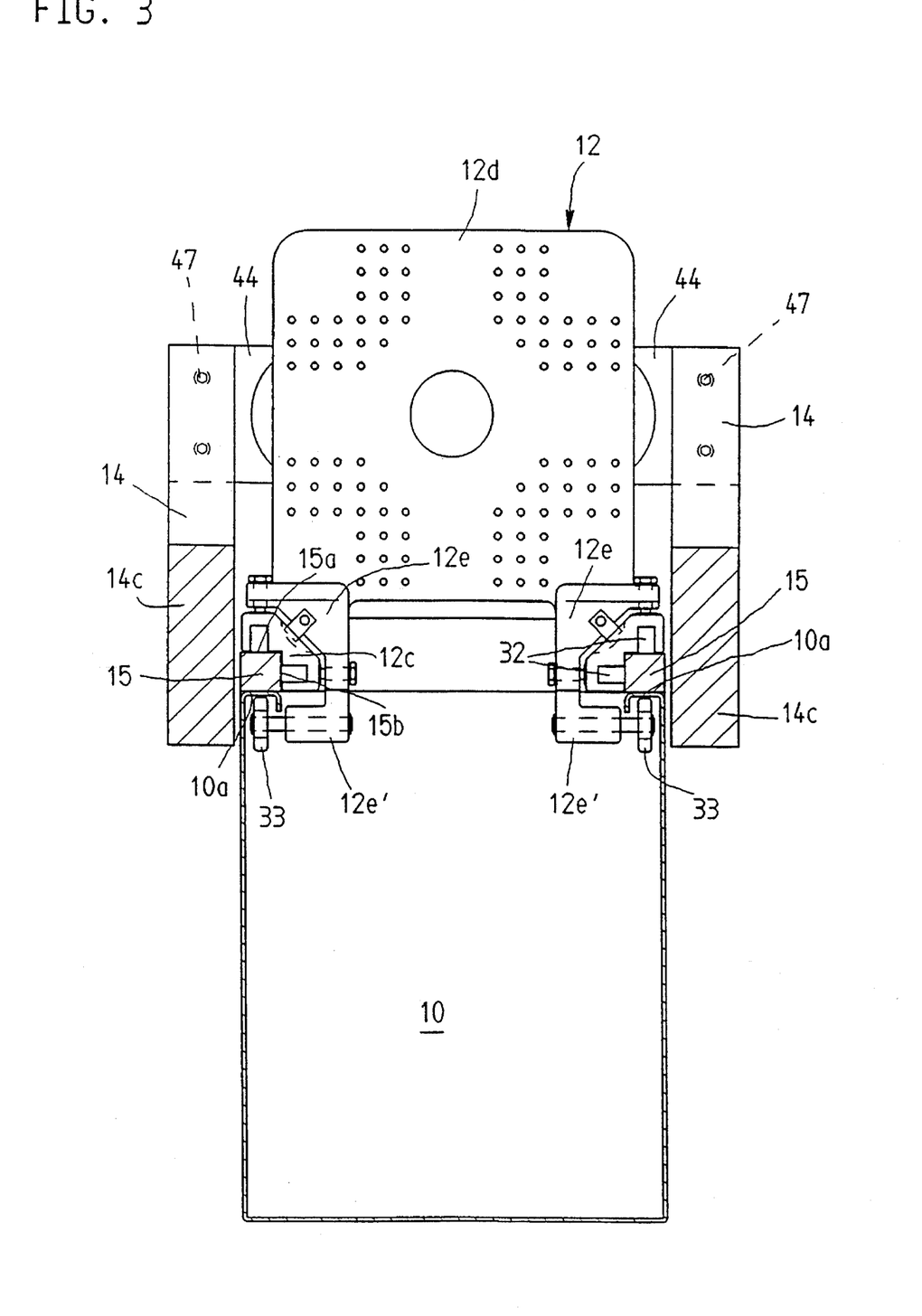
FIG. 3 is a sectional view through the mold closing unit according to line 3—3 of FIG. 1.

The movable mold carrier 12 has to be reliably guided together with the toggle mechanism, which is only coupled. Therefore the movable mold carrier is provided with a flat, plate-shaped part 12d standing in a vertical position and in the present embodiment with two supporting parts 12e. These parts of the movable mold carrier 12 might be cut from one piece or be jointly connected. The supporting parts 12e extend into an area outside the mold tentering space F, as well as into a direction towards the stationary mold carrier 11. That way the support surface and the surface for taking up the overturning moments are enlarged. These overturning moments arise, for example, when the movable mold carrier is displaced and as soon as the mold part associated to the movable mold carrier is connected with the movable mold carrier 12. The function of a pressure well arranged under the mold in an area of the parting plane t—t is not affected, since the support is effected in a brink area, which anyhow is already partially stressed by the upper border 10a of the machine base (FIG. 2).

According to FIG. 1 the movable mold carrier 12 in a side view has the form of a upside-down "T". The thickness of the movable mold carrier respective of the plate-shaped part 12d is so much reduced, that it can be produced by cutting, for example, flame-cutting a sheet steel in a cost saving manner. The dimensioning is made to the effect that the plate-shaped part 12d is dimensioned for taking up the axial forces occuring in closing direction, whereas the overturning moments are absorbed by the supporting part 12e. The movable mold carrier 12 has a plane of symmetry e—e running through the plate-shaped part 12d.

The second embodiment, shown in FIGS. 7–12, differs from the first embodiment shown in FIGS. 1–6 by the guiding type of the movable mold carrier 12. In both cases, the supporting parts 12e catch behind the guidings on the side opposite to the mold tentering space F and are led at the guidings by a central angle of at least 180°. In the first embodiment according to FIG. 3 in both supporting parts 12e, running elements, which are preferably roller casettes 32, are built-in and are led in a known manner at horizontal running surfaces 15a and vertical running surfaces 15b of a guide rod 15. The supporting part 12e engages with one arm 12e' in the machine base under the guide rod. At the arm 12e a back handle element 33 is arranged, which sits close from the bottom on a flanged border 10a of the machine base 10. In the second embodiment (FIGS. 7 to 12) ball bearings 34 are built in the supporting parts 12e and surround the guiding devices, which are guiding rods 21. In both cases the wrap-around is meant for taking up occuring forces, if necessary, which try to lift off the movable mold carrier from the machine base.

The jointed arrangement of the "Y-shaped toggle lever" also can be advantageously connected with a clamping means. To this the stationary mold carrier 11 is fixedly connected with at least a part of the machine base 10. The stationary mold carrier 11 is movably connected with the supporting element 13' by at least one clamping means. The deformable clamping means 14 essentially takes up the forces occuring when the mold 31 is in a closed position. The clamping means 14 is freely suspended and in these embodiments is constituted by two C-shaped shackles, which preferably engage in the border area of the stationary mold carrier 11 and the supporting element 13'. It is not absolutely necessary to use a shackle; other adequate forms or elements can be also applied. The coupling at the stationary mold carrier is effected via a bearing stud 19, which cooperates with a pilow block 27 and is arranged as a joint by screws 25, 26 between the stationary mold carrier 11 and the clamping means 14. The screws 26 are retractable in bore holes 14*b* of the clamping means. In the "side sheltered from the wind" of a leg 14*c* of the clamping means 14 guiding devices for the supporting parts 12*e* can be provided, without requiring separate space.

The principle of the clamping means 14 is to admit deformations at the clamping means 14, which serves as deformation element. The mold closing unit is in connection with the machine base 10 by only one fixed point, constituted by the fixing elements 23, at which the stationary mold carrier 11 is mounted. Besides, the mold closing unit is supported and axially movable in the closing direction.

The supporting element 13' is in connection with the clamping means 14. The clamping means 14 can be supported according to FIG. 5. The second bearing element 46 is thereby fixed at an angle in a neutral area of the clamping means 14. The precise adjustment can be realized by the adjusting element 50, which is supported on a sliding element 49. The sliding element 49 assumes the actual bedding on the guide rod 15. In order to avoid that the mold closing unit is lifted-off from the machine base, a further element 48 is axially and movably supported in a recess 10*b* of the machine base. Basically this element 48 does not touch the machine base 10. Only if a lifting force is exerted on the mold closing unit is a connection between the mold closing unit and machine base established. The bearing elements 46, according to FIG. 1, are arranged in a plane v—v substantially running through the link point 35 and lying perpendicularly to the closing direction. This position has been chosen, since this point is the joint point for the clamping means 14, so that here the lowest deformations are produced.

Figure 4:
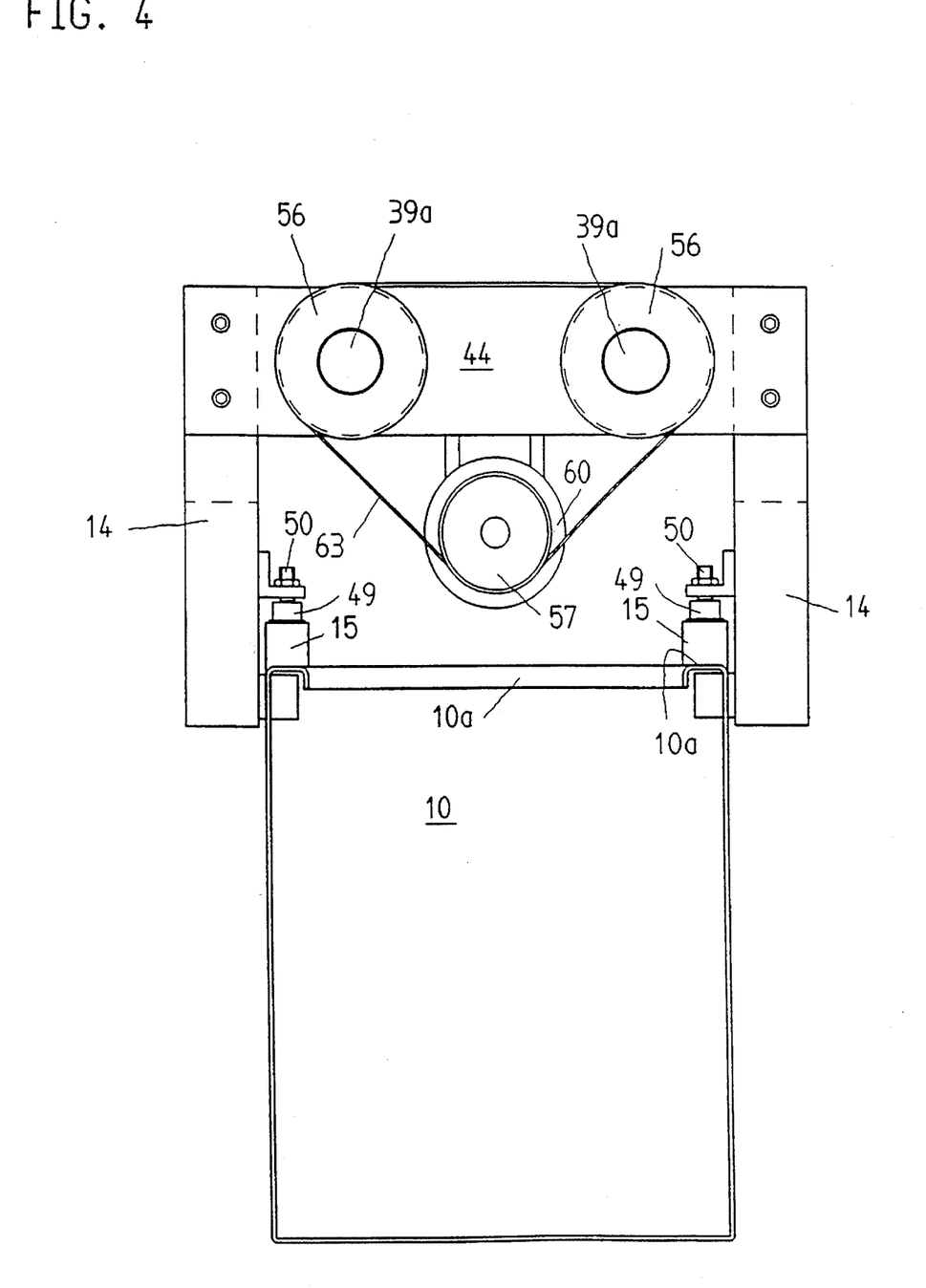
FIG. 4 is a sectional view through the mold closing unit according to line 4—4 of FIG. 1.
Figure 5:
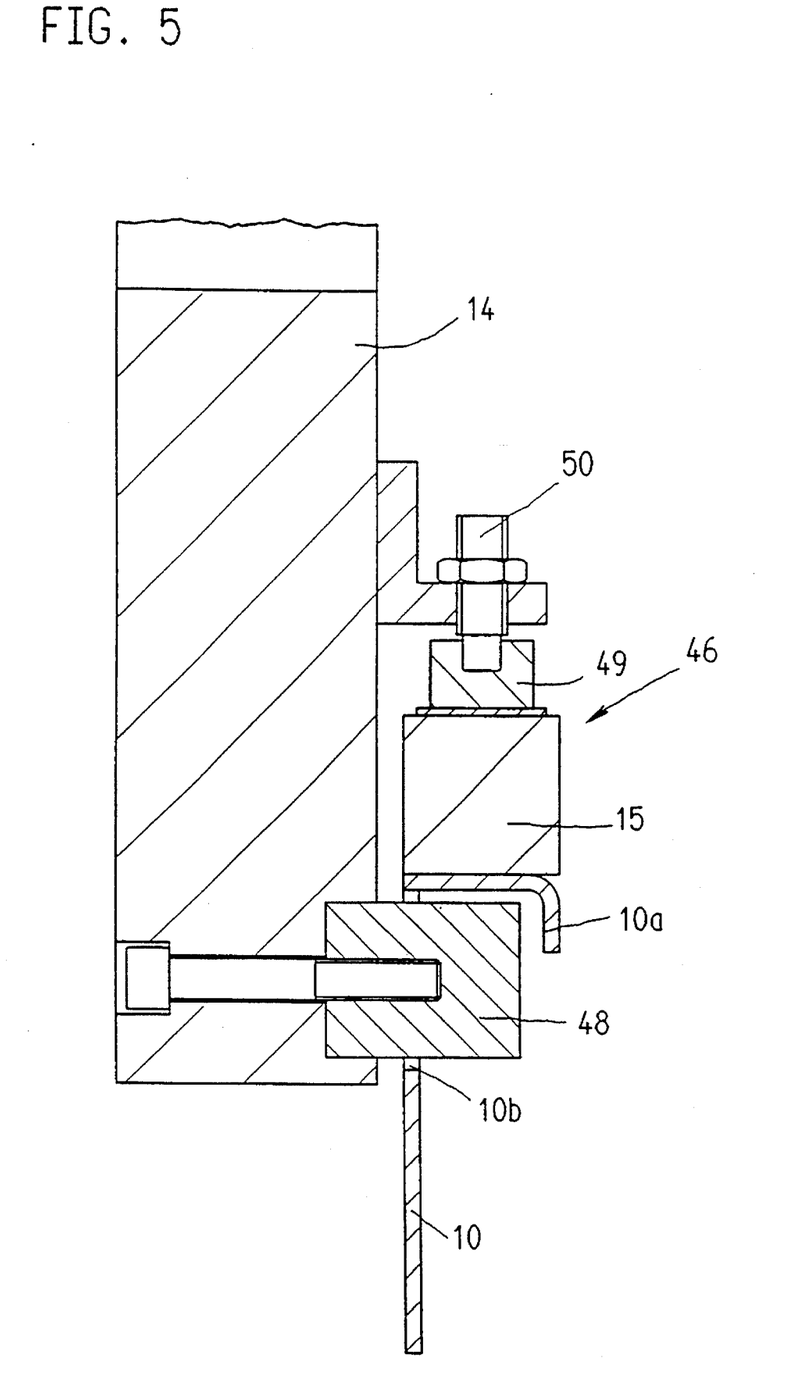
FIG. 5 shows an enlarged detail view according to line 5—5 of FIG. 1 in the area of the bearing.

When applying a toggle mechanism it is indispensable to provide a mold height regulating means V, which permits a steady position of the closing direction s—s, if molds with different heights are used. For this purpose a spindle drive 39 is provided, which according to FIG. 2 is supported at an abutment 44 and is in connection with the supporting element 13' by its threaded spindle 39*a*. Both spindle drives 39 can be each separately be driven when the machine is adjusted, so that an exact parallel adjustment between movable mold carrier 12 and stationary mold carrier 11 is granted. In an operating state both spindle drives are adjustable by a common drive 60. The drive 60 is connected with the abutment 44 by a support. Via a pulley 57 the drive actuates two further pulleys 56 for the threaded spindles 39*a* by a belt 63 (FIG. 4). From FIG. 2 it can be seen that the backlash of threads, which disturbs an exact summoning up of force and consequently the precision of the machine, is suppressed by disk springs 45 held at a spacer 44*a*. FIGS. 7–11 show a further possibility for elimination of the backlash of threads in the second embodiment, namely by actuating threaded bushes 62, which are pulleys, via a second drive. The drive 61 cooperates with a pulley 65. According to FIG. 9 in connection with FIGS. 11 and 12 the threaded bush 62 catches with its exterior thread into the thread of the spacer 44*a*. In a detached condition, the pulley 56 can be actuated by the drive 60, which leads to an adjustment of the threaded spindle 39*a*. The nut 71 of the spindle drive is held in a bore hole of the abutment 44. After adjustment has been effected the threaded bush 62 can be pressed in the direction of the spacer 44*a* by an opposed movement of the belt 65 of the second drive, so that the nut 71 is clinched by the threaded spindle 39*a* and the adjusting ring 73.

Figure 11:
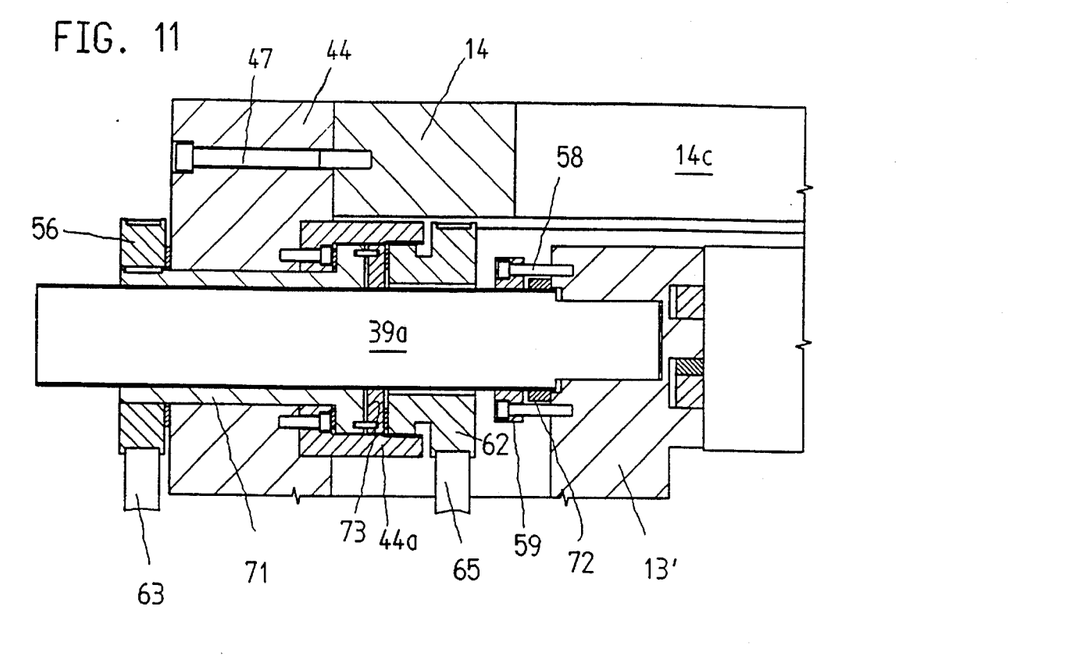
FIGS. 11 and 12 are sectional views through the mold height regulating means of FIG. 10 in the area of a spindle drive with different mold heights.
Figure 12:
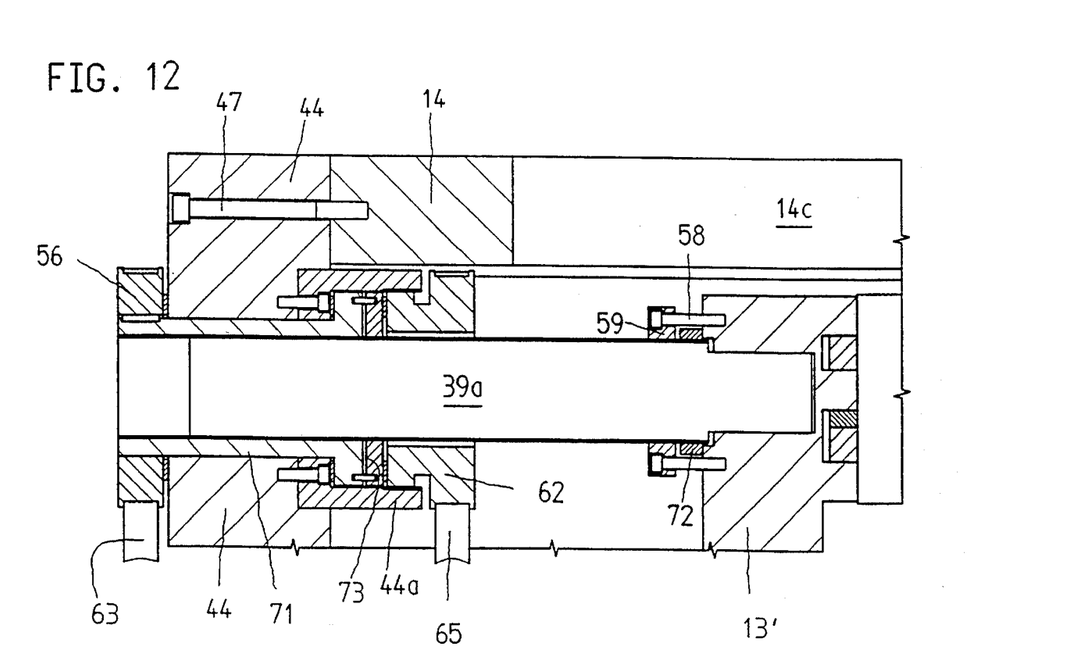

According to the FIGS. 11 and 12, the threaded spindle 39*a* is received in the supporting element 13' with backlash. The fixing is effected by tie bolts 58, which engage in a supporting ring 59. When tightening and so adjusting the tie bolts 58 the threaded spindle 39*a* is harnessed against the abutment 72.

In this system the toggle can be applied in three different ways. First of all it is possible to effect the displacement of the movable mold carrier 12 and the summoning-up of the locking pressure and the lifting force by the toggle mechanism Y. In this case the threaded spindles 39*a* between the supporting element 13' and the abutment 44 merely serve for adjusting the required height for mounting the tools. But it is also possible to use the toggle mechanism Y only for quick displacement of the mold carrier up to the height for mounting the tools, its toggle then already being in an extended position. In this case the locking pressure is summoned-up by the threaded spindles, which are to this purpose provided with a correspondingly strong drive. Finally it is also possible to cover the distance to the height for mounting the tools via the threaded spindles and to summon-up the required locking pressure afterwards by a very short lifting of the Y-toggle mechanism. The ball rolling spindle 41 holds the toggle substantially irreversibly in the extended position provided the toggle mechanism is in an extended condition.

It will be understood that the above description of the present invention is susceptible to various modifications, changes and adaptations, and the same are intended to be comprehended within the meaning and range of equivalents of the appended claims.

I claim:

1. A mold closing unit for use in an injection molding machine for processing synthetic materials, comprising:

a stationary mold carrier;

a movable mold carrier forming with said stationary mold carrier a mold clamping space therebetween;

a toggle mechanism having two levers connected together, one end of said toggle mechanism being jointedly connected to said movable mold carrier for moving said movable mold carrier along a closing direction and into and out of a closing position with said stationary mold carrier;

a supporting element for supporting said toggle mechanism and being connected to another end thereof; and an electro-mechanical driving unit arranged transverse to the closing direction, and comprising a quill motor, and a driving element for driving said toggle mechanism, said driving element comprising a ball rolling spindle at least partially receivable within said quill motor; said toggle mechanism jointedly connecting said electro-mechanical driving unit with said movable mold carrier and said supporting element, and freely movably holding said electro-mechanical driving unit.

2. The mold closing unit defined in claim 1, wherein said quill motor comprises a rotor having a sleeve located therein, and a thread nut coaxially connected to said sleeve; said ball rolling spindle engaging with said thread nut, and being received within said sleeve.

3. The mold closing unit defined in claim 1, further comprising at least one spindle drive supported by and fixable to said supporting element for regulating a height of a mold, and means for eliminating backlash of said spindle drive.

4. The mold closing unit defined in claim 3, further comprising an abutment supporting said at least one spindle drive; wherein said at least one spindle drive comprises two spindle drives each being driven by a common drive; and wherein said means for eliminating backlash comprises a plurality of continuously acting springs each connected to a respective spindle drive, and exerting a spring force against said abutment for eliminating any backlash.

5. The mold closing unit defined in claim 3, further comprising an abutment supporting said at least one spindle drive; wherein said at least one spindle drive comprises two spindle drives each being driven by a common drive; and wherein said means for eliminating backlash comprises an additional drive unit, and a plurality of threaded bushes each connected to a respective spindle drive, and each being driven by said additional drive unit to exert a force against said abutment for eliminating any backlash.

6. The mold closing unit defined in claim 3, wherein said at least one spindle drive comprises a threaded spindle; further comprising a supporting ring encompassing said threaded spindle, and a plurality of tie bolts engaged with said supporting ring and said supporting element for prestressing said threaded spindle against said supporting element.

7. The mold closing unit defined in claim 1, further comprising a machine base, and a force transmitting mechanism; wherein said stationary mold carrier is fixedly connected to said machine base, and is jointedly linked with said supporting element using said force transmitting mechanism, so that a force occurring between said movable mold carrier and said stationary mold carrier is transmitted around the mold clamping space.

8. The mold closing unit defined in claim 7, wherein said force transmitting mechanism is deformable by the force; said supporting element being movably supported at said machine base, and being movable in the closing direction.

9. The mold closing unit defined in claim 7, further comprising a plurality of bearing elements connected to said force transmitting mechanism for movably supporting said supporting element at said machine base, said bearing elements being located in a neutral area of said force transmitting mechanism and being located in a plane extending essentially perpendicular to the closing direction and through a link point of said toggle mechanism.

* * * * *